United States Patent
Bonnaud et al.

(10) Patent No.: US 7,651,108 B2
(45) Date of Patent: Jan. 26, 2010

(54) ASSEMBLY COMPRISING AT LEAST ONE DRIVE WHEEL AND A FAIRING FOR A HEAVY GOODS VEHICLE, AND THE CORRESPONDING HEAVY GOODS VEHICLE

(75) Inventors: Bernard Bonnaud, Courlay (FR); Bruno Cornuault, Saint Sauveur (FR)

(73) Assignee: Irisbus France S.A., Venissieux (FR)

( * ) Notice: Subject to any disclaimer, the term of this patent is extended or adjusted under 35 U.S.C. 154(b) by 758 days.

(21) Appl. No.: 11/257,288

(22) Filed: Oct. 24, 2005

(65) Prior Publication Data

US 2006/0131087 A1 Jun. 22, 2006

(30) Foreign Application Priority Data

Oct. 25, 2004 (FR) .................... 04 11365

(51) Int. Cl.
*B62D 25/18* (2006.01)
*B62D 25/16* (2006.01)

(52) U.S. Cl. .......... 280/157; 280/156; 280/847

(58) Field of Classification Search ........... 280/152.05, 280/156, 157, 847, 849, 851, 853, 854; 296/178, 296/198

See application file for complete search history.

(56) References Cited

U.S. PATENT DOCUMENTS

| | | | | |
|---|---|---|---|---|
| 415,021 A * | 11/1889 | Brown | ............... | 280/157 |
| 1,049,946 A * | 1/1913 | Tyrell | ............... | 280/157 |
| 1,400,010 A * | 12/1921 | Stirk | ............... | 280/156 |
| 1,403,446 A * | 1/1922 | Rothmann | ............... | 280/156 |
| 1,462,152 A * | 7/1923 | Smith | ............... | 280/157 |
| 1,587,762 A * | 6/1926 | Cunnington | ............... | 301/37.104 |
| 2,107,593 A | 2/1938 | Best | | |
| 2,352,464 A * | 6/1944 | Aerni | ............... | 280/160 |
| 2,759,282 A * | 8/1956 | LeCourt | ............... | 40/587 |
| 4,389,945 A * | 6/1983 | Bahrle et al. | ............... | 104/247 |
| 5,794,956 A | 8/1998 | Hurlburt et al. | | |
| 5,836,399 A * | 11/1998 | Maiwald et al. | ............... | 172/509 |
| 6,053,517 A | 4/2000 | Lodi et al. | | |
| 6,109,621 A | 8/2000 | Hettich et al. | | |
| 6,254,194 B1 * | 7/2001 | Capouellez et al. | ...... | 301/37.23 |

(Continued)

FOREIGN PATENT DOCUMENTS

DE 34 01 631 7/1985

(Continued)

*Primary Examiner*—S. Joseph Morano
*Assistant Examiner*—Vaughn T Coolman
(74) *Attorney, Agent, or Firm*—Stetina Brunda Garred & Brucker

(57) ABSTRACT

Drive wheel (6) is designed to pivot around a first axis (X-X'), which in particular is horizontal, for the purpose of advance of the vehicle, and around a second axis (Y-Y'), which in particular is vertical, for the purpose of steering of the vehicle, while fairing (8) extends laterally to the vicinity of wheel (6) when the vehicle is in operation, so that it at least partly covers an outer side of said wheel.

Fairing (8) is not linked in rotation to wheel (6) around the first axis, with the result that it is not constrained to rotate around said axis during the advance of the vehicle, whereas said fairing is linked in rotation to said wheel around the second axis, so that it follows the steering movements of said wheel.

11 Claims, 3 Drawing Sheets

U.S. PATENT DOCUMENTS

| | | | |
|---|---|---|---|
| 6,276,746 B1 * | 8/2001 | Gentry et al. | 296/180.1 |
| 6,443,529 B1 * | 9/2002 | Williams | 301/37.25 |
| 6,517,167 B2 * | 2/2003 | Baker | 301/37.25 |
| 6,802,517 B1 * | 10/2004 | Wuthrich | 280/157 |
| 7,093,909 B1 * | 8/2006 | Korpi et al. | 301/37.25 |
| 2007/0182151 A1 * | 8/2007 | Aulabaugh | 280/849 |

FOREIGN PATENT DOCUMENTS

| | | |
|---|---|---|
| EP | 1 314 633 | 5/2003 |
| FR | 615 590 | 1/1927 |
| GB | 430 879 | 6/1935 |

* cited by examiner

ASSEMBLY COMPRISING AT LEAST ONE DRIVE WHEEL AND A FAIRING FOR A HEAVY GOODS VEHICLE, AND THE CORRESPONDING HEAVY GOODS VEHICLE

CROSS-REFERENCE TO RELATED APPLICATIONS

Not Applicable

STATEMENT RE: FEDERALLY SPONSORED RESEARCH/DEVELOPMENT

Not Applicable

BRIEF SUMMARY OF THE INVENTION

This invention relates to an assembly comprising at least one drive wheel and a fairing for a heavy goods vehicle, and to a heavy goods vehicle comprising at least one such assembly.

For the purpose of this invention, "heavy goods vehicle" shall mean a vehicle whose total weight exceeds 3.5 tonnes. Said generic term shall mean in particular, by way of example but not of limitation, a coach, bus or truck.

The drive wheels constitute an awkward element in this type of motor vehicle, especially in terms of appearance, as they interrupt the line of the bodywork.

Moreover, as said drive wheels are moving parts, they are liable to constitute a danger because they may come into contact with pedestrians or other vehicles. The projectiles material thrown up by their rotation on wet ground is also a source of danger to other road users.

Under these circumstances, the above-mentioned problems have been solved in the following ways.

First of all, it has been proposed that the wheel rim should be fitted with a hub cap to conceal the most aggressive parts of the wheel. However, such a hub cap is obliged to follow the rotatory movement of the wheel during the advance of the wheel.

Another known solution is for the wheel assembly to be enclosed in a fixed casing. However, this solution cannot easily be applied to drive wheels, as the casing would have to be very large in order not to hinder the travel of the wheel during its steering movements. Said casing would therefore have to project from the rest of the vehicle body, which would cause it to exceed the maximum authorised width.

This last solution also presents a significant drawback in terms of safety. For example, the inflation pressure of a heavy goods vehicle tyre may exceed 9 bars, and if it bursts, the volume of air released is particularly large because of the size of the tyre. Consequently, at the time of the burst, parts of said casing are liable to become detached and constitute veritable projectiles, which may cause property damage and/or personal injury.

That being said, the present invention offers a fairing for the drive wheel of a heavy goods vehicle, which said fairing has compact overall dimensions but still provides satisfactory safety during use of the heavy goods vehicle.

Secondarily, the fairing according to the invention satisfactorily absorbs the energy released when a heavy goods vehicle tyre bursts.

The invention consequently relates to an assembly comprising at least one drive wheel and a fairing for a heavy goods vehicle, especially for a bus or a coach, said drive wheel being designed to pivot around a first axis, which in particular is substantially horizontal, for the purpose of advance of the vehicle, and around a second axis, which in particular is substantially vertical, for the purpose of steering of the vehicle, which said fairing extends laterally to the vicinity of said wheel when the vehicle is in operation, so that it at least partly covers an outer side of said wheel, which said assembly is characterised in that said fairing is not linked in rotation to said wheel around the first axis, so that it is not constrained to rotate around said axis during the advance of the vehicle, while said fairing is linked in rotation to the wheel around the second axis, so that when the vehicle is in operation it follows the steering movements of said wheel.

According to further characteristics of the invention:
the fairing is integral with a coupling, which is connected in rotation and translation to a hub of the wheel;
the fairing is integral with a wheel spindle;
removable means for connecting the fairing to the coupling linked to the wheel hub are provided;
the removable connecting means include crimping means;
the crimping means are designed to allow the fairing to be secured around a terminal stud of the spindle;
the crimping means comprise a connector belonging to the fairing, which contains an opening designed to receive the stud, and means are provided which allow the transverse dimension of said block to be varied so that the latter is crimped around the stud;
the block contains at least one notch, while the means which enable the transverse dimension of the block to be varied comprise two lugs situated one on either side of at least one notch, and a nut and bolt assembly designed to bring said two lugs closer together;
the fairing comprises a reinforcing frame and a cowl;
the reinforcing frame comprises a plurality of arms which extend from a central area, in particular four arms which together form a figure X;
each arm is enlarged in the vicinity of the end at which it is attached to the cowl, in particular by gluing;
the cowl has a disc shape which is truncated at the level of a truncated portion forming the lower end of the fairing;
the cowl is fitted with an access flap for a user in the direction of the wheel;
the cowl is made of a composite material;
the outer part of the cowl is made of a fibreglass-reinforced vinyl ester resin, and the inner part is made of fabrics consisting of aramid fibres blended with fibreglass.

The invention also relates to a heavy goods vehicle, especially a coach or bus, comprising a body, at least one front axle and at least one rear axle, at least one of which said axles comprises at least one assembly consisting of at least one drive wheel and a fairing, characterised in that the/each assembly is as defined above.

According to an advantageous characteristic of the invention, said truncated portion is flush with the bottom of the vehicle body.

BRIEF DESCRIPTION OF THE DRAWINGS

The invention will be better understood, and other advantages thereof will appear more early, in the light of the following description of a drive wheel and a fairing conforming to the principle thereof, provided by way of example but not of limitation, by reference to the annexed drawings, wherein.

DETAILED DESCRIPTION

Figure 1:
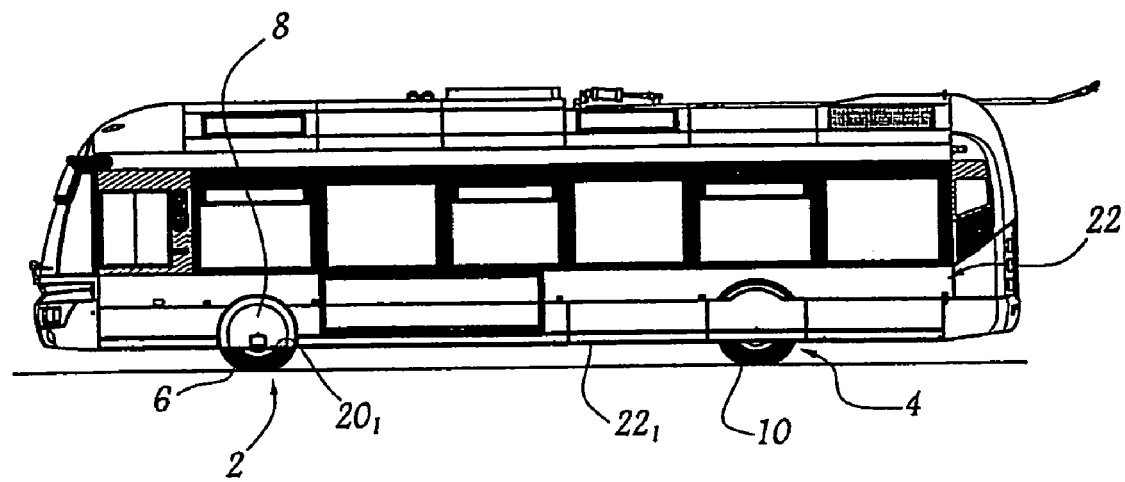
FIG. 1 is a side view of a heavy goods vehicle in accordance with the invention.

FIG. 1 shows a heavy goods vehicle in accordance with the invention, specifically a bus. The vehicle is fitted, in a conventional manner, with a front axle 2 and a rear axle 4.

Front axle 2 is fitted with two drive wheels, of which only no. 6 is illustrated, and each of said drive wheels is associated to a fairing, of which only no. 8 is illustrated in FIG. 1. Moreover, rear axle 4 is fitted with at least two non-drive wheels, which are therefore not liable to steer, of which only no. 10 is shown in FIG. 1.

Figure 2:
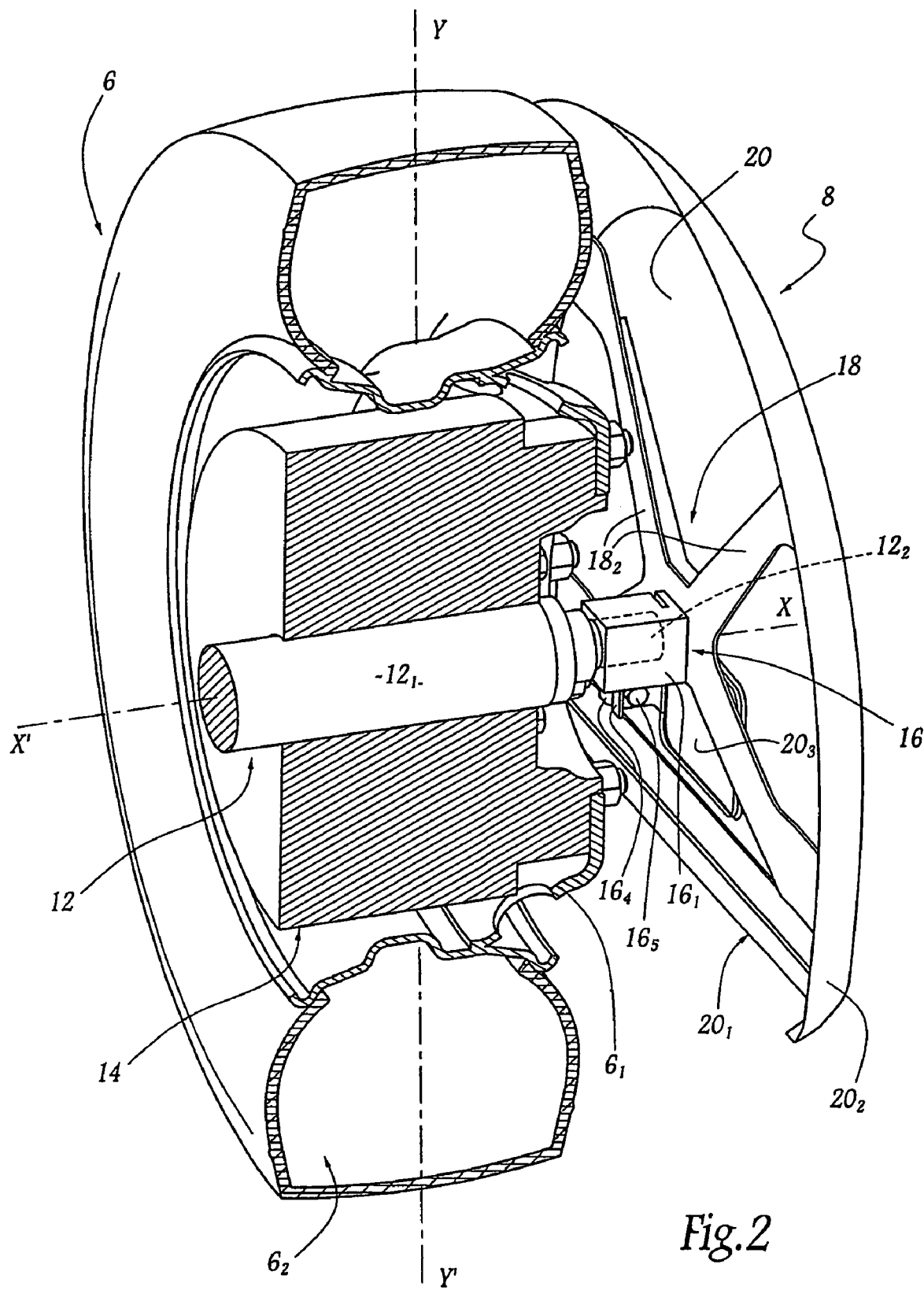
FIG. 2 is a perspective view of a drive wheel and a fairing belonging to the heavy goods vehicle shown in FIG. 1.

FIG. 2 more precisely illustrates the assembly comprising said front wheel 6 and fairing 8. Conventionally, wheel 6 has a rim $6_1$ and a tyre $6_2$.

Said wheel is primarily designed to turn around a first axis marked X-X', according to a rotatory movement corresponding to the advance of the vehicle. It is also designed to pivot around a second axis, marked Y-Y', according to a rotatory movement corresponding to the steering of said wheel.

In operation, axis X-X' is globally parallel to the road, and thus usually horizontal. Axis Y-Y' is globally perpendicular to the road, and thus usually vertical.

Wheel 6 is fitted with a spindle 12, of a type that is known in itself, which extends along said axis X-X'. Said spindle 12 possesses a cylindrical shaft $12_1$, around which is fitted a brake lining 14, which is partially illustrated. Said shaft $12_1$ terminates in a cylindrical stud $12_2$, which is coaxial with and has a smaller diameter than shaft $12_1$.

Fairing 8 comprises a block 16 which joins it to stud $12_2$, a reinforcing frame 18 and a cowl 20.

Figure 4:
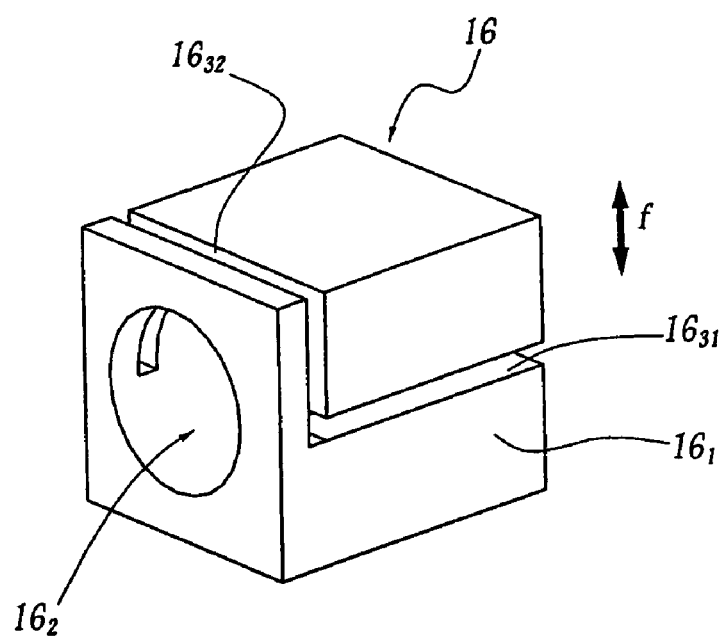
FIG. 4 is a perspective view on a larger scale of a connection block belonging to the fairing shown in FIG. 2.

More specifically, connection block 16 comprises a globally parallelepipedal body $16_1$, which contains an opening $16_2$ designed to receive stud $12_2$. As shown in greater detail in FIG. 4, there are two notches in body $16_1$. One is an axial notch $16_{31}$ in relation to the main axis of opening $16_2$, and the other is a transverse notch $16_{32}$.

Two lugs $16_4$, fitted one on either side of axial notch $16_{31}$, enable the transverse dimension of body $16_1$ to be varied. For this purpose, said lugs $16_4$ contain openings into which a bolt $16_5$, associated with a nut which is not illustrated, can be inserted.

When the relative positions of said bolt and nut are varied, the two lugs $16_4$, and consequently the walls of axial notch $16_{31}$, can be brought closer together. This helps to crimp connection block 16 around stud $12_2$, in order to secure them to one another. This crimping is performed in the direction of double arrow f illustrated in FIG. 4, in which the two lugs $16_4$ are not shown.

Figure 3:
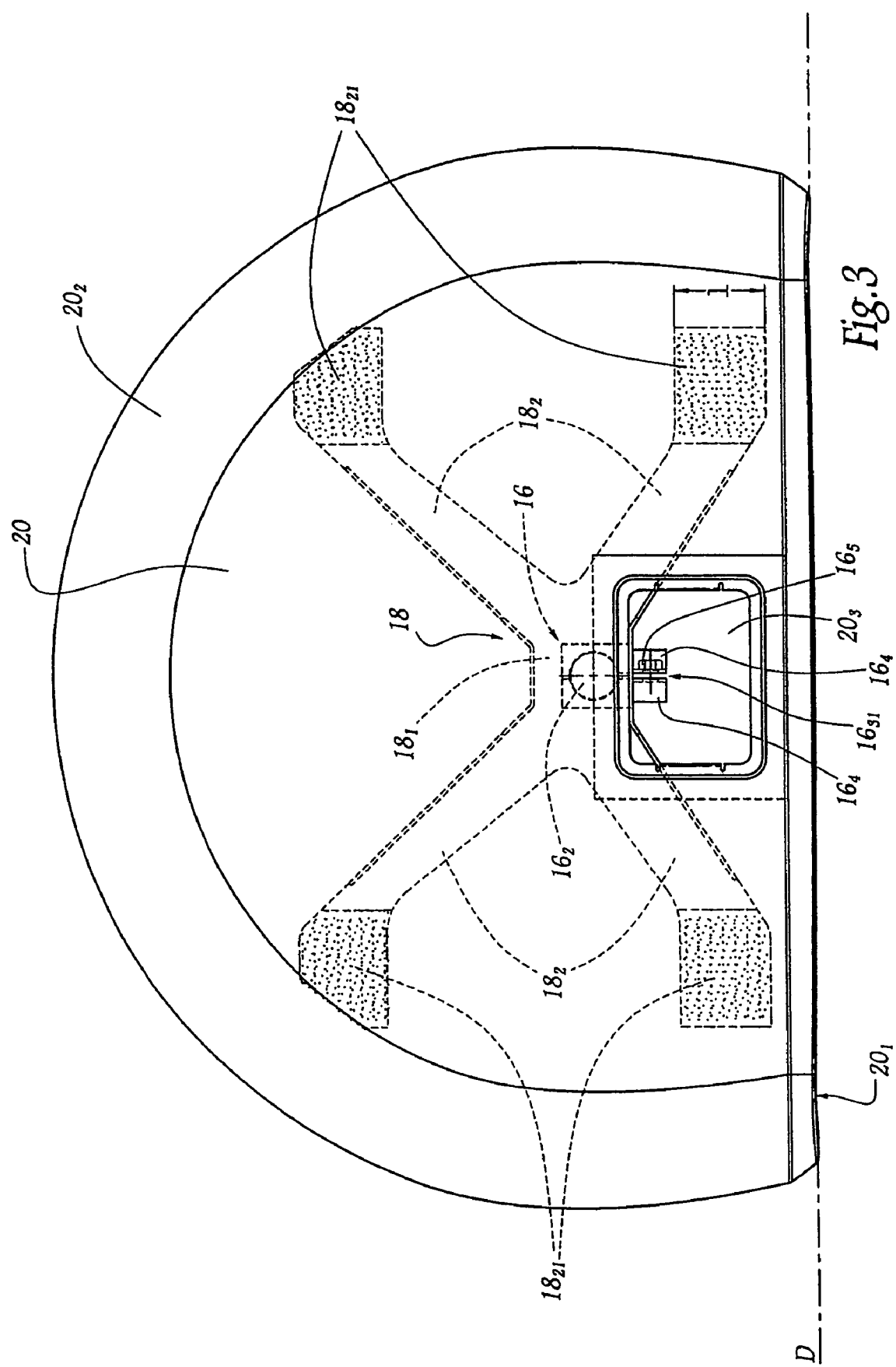
FIG. 3 is a front view of the fairing shown in FIG. 2.

As shown in greater detail in FIG. 3, reinforcing frame 18 comprises a central area $18_1$ which allows said frame to be attached, for example by welding, to connection block 16. There are also four arms $18_2$, which extend from central area $18_1$ to form substantially a figure X.

Free end $18_{21}$ of said arms, namely the end opposite to central area $18_1$, presents a transverse dimension or width 1 greater than that of the rest of the arm. This allows the arms to be attached satisfactorily, for example by gluing, to cowl 20. Reinforcing frame 18 is made of metal, such as stainless steel.

Finally, seen from the front, cowl 20 has a disc shape truncated by a straight line D, which runs substantially parallel to the road. As shown in FIG. 1, when fairing 8 is fitted, its lower end, namely portion $20_1$ of cowl 20 truncated by straight line D, is flush with the bottom $22_1$ of body 22 of the vehicle.

Cowl 20 also presents an outer flange $20_2$, which is recessed; in other words, it projects slightly in the direction of drive wheel 6. Finally, said cowl 20 is equipped with a flap $20_3$, which enables the user to access lugs $16_4$ and bolt $16_5$ manually. This allows easy detachment of fairing 8 from spindle 12.

Cowl 20 is made of a composite material. By way of example but not of limitation, its external part, opposite to wheel 6, is formed by a fibreglass-reinforced vinyl ester resin, while its internal part is formed by aramid fibre fabrics blended with fibreglass.

In operation, fairing 8, which partly covers the outer side of said wheel 6, is integral with the steering movements of wheel 6; in other words, it is constrained to pivot with the wheel around axis Y-Y'. However, said fairing 8 is not linked in rotation to wheel 6 around axis X-X', with the result that it does not rotate around said axis during the advance of the vehicle. In practice, fairing 8 is integral with spindle 12, which is linked to the wheel hub; in other words, said spindle follows the rotatory movements of the wheel around steering axis Y-Y', but is not constrained to rotate around axis X-X'.

As a result of this design, a hub cap can be fitted, the top part of which is large enough to cover the tyre of the wheel. Moreover, the lower part $20_1$, can be truncated so that drive wheel 6 of the heavy goods vehicle can come very close to a pavement without any interference between the pavement and fairing 8.

The invention also allows the absorption of the energy released if a tyre should burst. For this purpose, the quantity of aramid fibres with high elastic strength is calculated so as to absorb the energy released without tearing, by means of a slight elastic deformation or slight permanent deformation. The fibreglass also provides a perfect bond between the resin and the fabric, thus preventing delamination between the various reinforcements. Consequently, despite the shock wave generated when a tyre bursts, the hub cap remains in one piece, without being affected by any projectile material.

What is claimed is:

1. An assembly comprising at least one drive wheel (6) liable to steer and a fairing (8) for a heavy goods vehicle, said drive wheel (6) being designed to pivot around a first axis (X-X'), which is substantially horizontal, for the purpose of advance of the vehicle, and around a second axis (Y-Y'), which is substantially vertical, for the purpose of steering of the vehicle, said fairing (8) extending laterally to the vicinity of said drive wheel (6) when the vehicle is in operation, so that it at least partly covers an outer side of said drive wheel, wherein said fairing (8) is not linked in relation to said drive wheel (6) around the first axis (X-X'), so that it is not constrained to rotate around said first axis during an advance movement of the vehicle, while said fairing is linked in rotation to the drive wheel around the second axis (Y-Y'), so that when the vehicle is in operation it follows the steering movements of said drive wheel, wherein said fairing (8) is integral with a spindle (12) linked in rotation and translation to the hub of said drive wheel (6), wherein means (16) are provided for removable connection of said fairing (8) to said spindle (12) connected to said hub, wherein the removable connection means comprise crimping means designed to allow the fairing to be secured around a terminal stud ($12_2$) of said spindle (12), wherein the crimping means comprise a block belonging to said fairing (8), which contains an opening ($16_2$) designed to receive said terminal stud, while means ($16_4$, $16_5$) are provided which allow the transverse dimension of said block to be varied (arrow f) in order to crimp said block around said terminal stud.

2. Assembly comprising at least one drive wheel (6) and a fairing (8) for a heavy goods vehicle, as claimed in claim 1, wherein said fairing (8) comprises a reinforcing frame (18) and a cowl (20).

3. Assembly comprising at least one drive wheel (6) and a fairing (8) for a heavy goods vehicle, as claimed in claim 2, wherein the reinforcing frame comprises a plurality of arms ($18_2$) which extend from a central area ($18_1$), in particular four arms which together form a figure X.

4. Assembly comprising at least one drive wheel (6) and a fairing (8) for a heavy goods vehicle, as claimed in claim 3, wherein each arm ($18_1$) is enlarged in the vicinity of the end thereof ($18_{21}$) designed to be attached to the cowl, in particular by gluing.

5. Assembly comprising at least one drive wheel (6) and a fairing (8) for a heavy goods vehicle, as claimed in claim 2, wherein said cowl (20) is made of a composite material.

6. Assembly comprising at least one drive wheel (6) and a fairing (8) for a heavy goods vehicle, as claimed in claim 5, wherein an outer part of said cowl (20) is formed by a fibreglass-reinforced vinyl ester resin, and an inner part thereof is made of fabrics consisting of aramid fibres blended with fibreglass.

7. Assembly comprising at least one drive wheel (6) and a fairing (8) for a heavy goods vehicle, as claimed in claim 2, wherein the cowl presents a disc shape which is truncated at the level of a truncated portion ($20_1$) forming the lower end of the fairing (8).

8. Assembly comprising at least one drive wheel (6) and a fairing (8) for a heavy goods vehicle, as claimed in claim 1, wherein said block contains at least one notch ($16_{31}$, $16_{32}$), while the means allowing the transverse dimension of the block to be varied comprise two lugs ($16_4$), situated one on either side of the at least one notch, and a bolt and nut assembly ($16_5$) designed to bring said lugs close together.

9. Assembly comprising at least one drive wheel (6) and a fairing (8) for a heavy goods vehicle, as claimed in claim 2, wherein said cowl (20) is fitted with a flap ($20_3$) giving the user access in the direction of wheel (6).

10. A heavy goods vehicle, comprising a body (22), at least one front axle (2) and at least one rear axle (4), said at least one front axle (2) comprising at least one assembly including at least one drive wheel (6) liable to steer and a fairing (8), said drive wheel (6) being designed to pivot around a first axis (X-X') which is substantially horizontal, for the purpose of advance of the vehicle, and around a second axis (Y-Y') which is substantially vertical, for the purpose of steering of the vehicle, said fairing (8) extending laterally to the vicinity of said drive wheel (6) when the vehicle is in operation, so that it at least partly covers an outer side of said drive wheel, wherein said fairing (8) is not linked in relation to said drive wheel (6) around the first axis (X-X') so that it is not constrained to rotate around said first axis during an advance movement of the vehicle, while said fairing is linked in rotation to the drive wheel around the second axis (Y-Y'), so that when the vehicle is in operation it follows the steering movements of said drive wheel, wherein said fairing (8) is integral with a spindle (12) linked in rotation and translation to the hub of said drive wheel (6), wherein means (16) are provided for removable connection of said fairing (8) to said spindle (12) connected to said hub, wherein the removable connection means comprise crimping means designed to allow the fairing to be secured around a terminal stud ($12_2$) of said spindle (12), wherein the crimping means comprise a block belonging to said fairing (8), which contains an opening ($16_2$) designed to receive said terminal stud, while means ($16_4$, $16_5$) are provided which allow the transverse dimension of said block to be varied (arrow f) in order to crimp said block around said terminal stud.

11. Heavy goods vehicle as claimed in claim 10, wherein said fairing (8) comprises a reinforcing frame (18) and a cowl (20) having a disc shape truncated at the level of a truncated portion ($20_1$) forming a lower end of the fairing (8), said truncated portion ($20_1$) being flush with a bottom ($22_1$) of the vehicle body (22).

* * * * *